J. G. SAWICKI.
PNEUMATIC TIRE.
APPLICATION FILED OCT. 5, 1921.
1,413,619.
Patented Apr. 25, 1922.
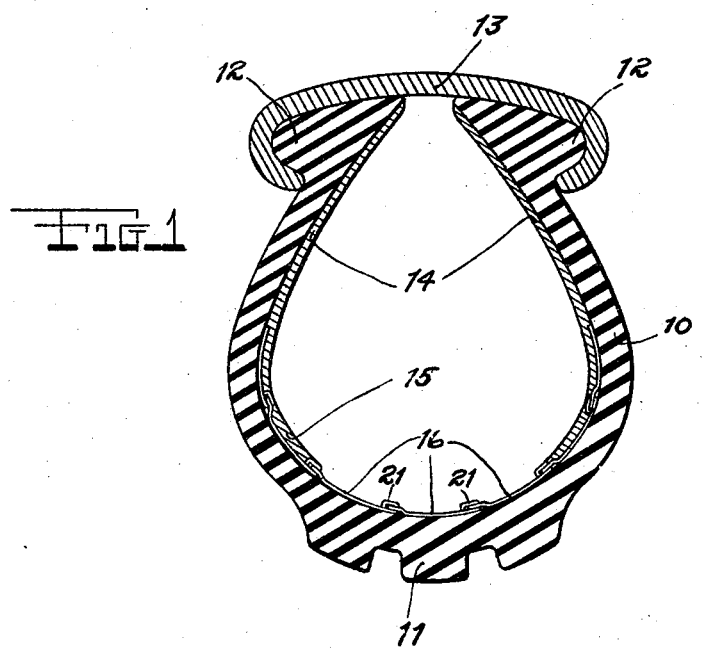
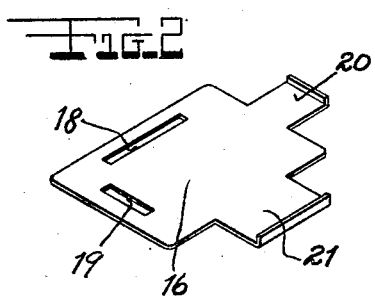
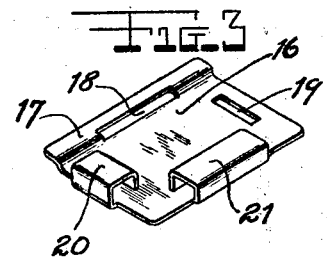
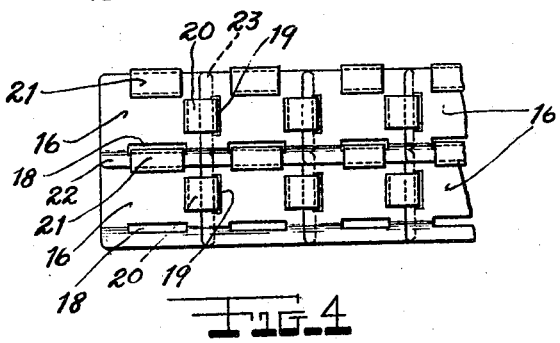
INVENTOR
Joseph G. Sawicki
BY
ATTORNEY

UNITED STATES PATENT OFFICE.

JOSEPH G. SAWICKI, OF ESSEXVILLE, MICHIGAN.

PNEUMATIC TIRE.

1,413,619.  Specification of Letters Patent.  Patented Apr. 25, 1922.

Application filed October 5, 1921. Serial No. 505,499.

*To all whom it may concern:*

Be it known that I, JOSEPH G. SAWICKI, a citizen of the United States, residing at Essexville, in the county of Bay and State of Michigan, have invented certain new and useful Improvements in Pneumatic Tires, of which the following is a specification.

One of the objects of this invention is to provide a flexible resilient articulated metal lining band adapted to be held closely adjacent the inner surface of the shoe for the purpose of deflecting and preventing nails, tacks and other objects from penetrating the air tube normally inflated inside a pneumatic tire shoe.

Another object is the provision of means by which the metal band elements may be moulded or embedded within continuing side wings, consisting of a tough rubber or a fabric and rubber composition.

These and other objects are attained by the novel construction and arrangement of parts, hereinafter described and shown in the accompanying drawings forming a material part of this disclosure and in which:—

Figure 1, is a transverse section through a tire equipped with the lining band.

Figure 2 is a perspective view of a plate element before final forming.

Figure 3 is a perspective view of a plate element after final forming.

Figure 4 is a view interior of the tire showing a portion of the plates linked together.

Referring to the figures in detail, the numeral 10 designates in general a pneumatic tire shoe, comprising a casing tread 11, and having beads 12 engaged within a rim 13. A pair of flexible wings 14, and adapted to conform interiorly to the inner sides of the shoe 10, are formed of a tough rubber composition or a combination of rubber and a fabric, the inner thickened portions 15 having fixed in them the edge plates of a linked band, composed of a plurality of plates 16 comprising an offset side 17 having an elongated slot 18 formed therethrough, and a shorter slot 19 which passes transversely through the plate 16 parallel to the end.

Raised rectangular hooks 20 and 21 are formed opposite to and parallel with the slots 18 and 19, integral with the plate 16.

By reference to the Figure 4 the method of assembling the plates will be seen, and consists essentially of interlocking the hook elements 20 and 21 into the slots 19 and 18 respectively.

It will also be seen that the plates 16 are overlapped on one side and one edge by succeeding adjacent plates as at 22 and 23 thus forming a flexible articulated practically imperforate endless band, structurally adapted to conform to the interior of a pneumatic tire.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

A protective liner for inflatable tires adapted to be disposed between the tread shoe and inner tube, comprising a plurality of articulated metallic plates, each of said plates being substantially rectangular, laterally curved in conformity with the inner radius of the shoe and longitudinally curved to conform with the inner diameter of the shoe, said plates having elongated slots parallel and adjacent to one of its side and end edges, and extensions on the sides and ends opposite the mentioned slots, said extensions being passed through the slots on adjacent plates and bent to completely surround the material between the slots and the outer edges thus interlocking adjacent plates, the edges of the plates being bent to overlap those adjacent to form a yielding band completely enveloping the inner tube over its outermost portion.

In witness whereof I affix my signature.

JOSEPH G. SAWICKI.